3,218,145
DEFOLIATION OF PLANTS
Lewis Edward Goyette, Richmond, Va., assignor to Socony Mobil Oil Company, Inc., a corporation of New York
No Drawing. Filed June 27, 1962, Ser. No. 205,567
10 Claims. (Cl. 71—2.3)

This invention relates to a new class of organophosphorus compounds as defoliants. Specifically, the invention relates to defoliant compounds defined by the formula

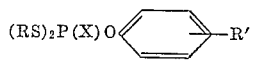

wherein R is an alkyl group containing from 1 to 4 carbon atoms, inclusive, and R' is an alkyl group containing from 1 to 8 carbon atoms, inclusive, and X is oxygen or sulfur. The invention also relates to compositions containing minor amounts of these compounds together with major amounts of inert carriers therefor.

Substances which tend to duplicate the effect of a light frost on a plant, resulting in leaf-drop, are commonly referred to as defoliating agents. The effect of such a material is equivalent to a light frost, causing the formation of abscission layers of cells across the petiole base of the leaves of the plants. The result is a premature leaf drop.

By far the largest use at present for defoliants is in the defoliation of cotton plants. However, defoliation is not confined to the cotton plant, there being interest in defoliants for other plants such as roses, hydrangeas, soybean and many others. It is contemplated, therefore, that the chemicals disclosed herein will be effective against those plants which have an annual leaf drop in general, although the present work is primarily concerned with the defoliation of cotton plants.

Normal cotton plants which have not been treated with defoliants have their lower bolls opening first, while the bolls on the upper branches continue to open over a period of as long as two months from the time when picking of the lower bolls is desirable. In this situation, the majority of the leaves remain attached to the plant, causing stains on the cotton when mechanical pickers are employed. Additionally, the upper leaves shade the lower bolls from both sunlight and air, thus causing excessive boll rot. It is not unusual to lose up to 15% of the cotton crop because of this shade-induced boll rot.

When defoliants are used, leaves are shed, with the result that the bolls open more uniformly. Thus, the entire crop may be machine harvested at one time and also at an earlier time because of the quick loss of leaves.

The amount of defoliant to be applied will depend upon the kind of vegetation to be defoliated and the density of the plants in a given field, as well as the choice of the compound. As will be illustrated in the examples to follow, emulsions containing as little as 0.05% by weight of the active ingredients have been found effective on cotton plants. The compounds of this invention will be effective in commercial use when applied in the range of about one to about fifty pounds per acre. It is understood, however, that this range is not to be construed as representing either minimum or maximum limits.

Under field conditions, the defoliant may be applied to the cotton generally when the bolls are about 45 days old. This, however, may vary with the season, climate and variety of plant.

Efficient defoliant compositions may be obtained when oil in water emulsions of solutions of the disclosed compounds in oil are prepared. The word "oil" is here used to designate any liquid which is a solvent for the compounds and which is insoluble in water. Such oils may be xylene, kerosene, diesel oil, benzene, carbon tetrachloride, ether, heptane, heavy mineral oils and water-insoluble solutions of water-soluble liquids in water-soluble liquids such as solutions of ethyl alcohol in kerosene. The emulsions may be obtained by first dissolving the compound in the oil and then mixing the resulting solution with water in the presence of an emulsifying agent. In the field this mixture of active ingredients, oil and emulsifying agent is to be mixed with water prior to actual application to the cotton plant. Any of the many methods of spray application may be used. Normally, in the absence of any specified rate per acre, the emulsion will be sprayed just to the point of liquid run-off.

Emulsifying agents customarily used in the art for the preparation of oil-in-water emulsions are operable in the practice of this invention, e.g., ionic or non-ionic agents such as the long-chain alkyl benzene sulfonates or polyglycol ethers. Such emulsifying agents are normally employed in only very small quantities, i.e., in concentrations up to about 0.3% by weight of the total formulation. It is, however, possible to use any amount less than that which would be detrimental to the plant itself. Some emulsifiers show phytotoxic tendencies, but normally concentrations up to about 5% by weight of the total formulation do not normally damage healthy plants.

While the compounds of this invention may advantageously be used as defoliants when formulated as above, they may also be dissolved in organic solvents or so-called oils as described above, and such solutions applied directly to the cotton plants. They may also be mixed with solid carriers such as clay, talc, pumice, and bentonite and dusted onto cotton or other plants in this form. The compounds may also be mixed with and applied with liquid or solid agricultural pesticides.

As an example of a general method for preparing the disclosed compounds, the S,S-dipropyl O-m,p-tolyl phosphorodithioate may be prepared by reacting substantially one mole of m,p-cresol with one mole of phosphorus trichloride, reacting this product with substantially two moles of propyl mercaptan and finally oxidizing this product with hydrogen peroxide or another appropriate oxidizing agent. The other phosphorodithioates disclosed and claimed herein as defoliants may be prepared in substantially the same manner, substituting, of course, the appropriate mercaptan and substituted phenol. If the phosphorotrithioate is desired, sulfur may be substituted for the hydrogen peroxide.

The following tests will illustrate the defoliation activity of the S,S-dialkyl O-aryl phosphorodithioates of this invention. It will be understood that the invention is not to be limited to those compounds shown.

Cotyledon test.—A formulation containing 500 parts of the test compound was prepared from 125 mg. of the compound, 10 ml. of acetone, 239 ml. of water and 1 ml.

of a 1:1 mixture of xylene and Atlox 3335 (a mixture of alkyl aryl sulfonates blended with polyoxyethylene sorbiton esters of mixed fatty and resin acids). Thirty-day-old cotton plants having their first two true leaves fully developed were treated by dipping the cotyledons in the solution. The following results were taken.

| Compound | Percent Defoliation | | |
|---|---|---|---|
| | 4 days | 6 days | 7 days |
| $(C_3H_7S)_2P(O)O$—⟨⟩—$CH_3(m,p-)$ | | | 100 |
| $(C_3H_7S)_2P(O)O$—⟨⟩—$CH_3(p)$ | 100 | 100 | |
| $(C_4H_9S)_2P(O)O$—⟨⟩—$CH_3(m,p)$ | 60 | 90 | |
| $(C_4H_9S)_2P(O)O$—⟨⟩—$C_4H_9(tert)$ | 100 | 100 | |
| $(C_4H_9S)_2P(O)O$—⟨⟩—$C_8H_{17}(p)$ | 60 | 90 | |

*Cotton spray test.*—Cotton plants approximately 2–3 months old were chosen for this test. 2000 p.p.m. formulations of the test compounds were prepared from 200 mg. of the compound, 10 ml. of acetone, 89 ml. of water and 1 ml. of 1:1 mixture of xylene and Atlox 3335. Each chemical was sprayed on two sets of cotton plants, and the results were taken 7 days later. Results are averages.

| Compound | Percent Defoliation |
|---|---|
| $(C_3H_7S)_2P(O)O$—⟨⟩—$CH_3(m,p)$ | 100 |
| | 97 |
| $(C_4H_9S)_2P(O)O$—⟨⟩—$CH_3(m,p)$ | 100 |
| | 100 |

As examples of other compounds coming within the scope of the invention, there may be mentioned S,S-dimethyl O-m-p-tolyl phosphorodithioates, S-S-diethyl O-butylphenyl phosphorodithioate, S-S-dibutyl O-amylphenyl phosphorodithioate, S-S-dipropyl O-isopropylphenyl phosphorodithioate, S,S-diethyl O-octylphenyl phosphorodithioate, S,S-dimethyl O-m,p-tolyl phosphorotrithioate, S,S-diethyl O-butylphenyl phosphorotrithioate, S,S-dibutyl O-amylphenyl phosphorotrithioate, S,S-dipropyl O-isopropylphenyl phosphorotrithioate, S,S-diethyl O-octylphenyl phosphorotrithioate, S,S-dipropyl O-totyl phosphorotrithioate, S,S-dibutyl O-butylphenyl phosphorotrithioate, S,S-dibutyl O-octylphenyl phosphorotrithioate, and S,S-dnbutyl O-totyl phosphorotrithioate.

I claim:
1. A method of defoliating living plants having an annual leaf drop, which comprises applying to the leaves thereof, in an amount sufficient to effect defoliation, a phosphorothioate of the formula

$$(RS)_2P(X)O\text{—⟨⟩—}R'$$

wherein R is alkyl containing from 1 to 4 carbon atoms, R' is alkyl containing from 1 to 8 carbon atoms, and X is a member of the group consisting of oxygen and sulfur.

2. A method according to claim 1 in which R is propyl, R' is methyl, and X is oxygen.
3. A method according to claim 1 in which R is butyl, R' is methyl, and X is oxygen.
4. A method according to claim 1 in which R is butyl, R' is butyl, and X is oxygen.
5. A method according to claim 1 in which R is butyl, R' is octyl, and X is oxygen.
6. A method of defoliating cotton which comprises applying thereto when the plants contain bolls, in an amount sufficient to effect defoliation, a phosphorothioate of the formula $$(RS)_2P(X)O\text{—⟨⟩—}R'$$

wherein R is alkyl containing from 1 to 4 carbon atoms, R' is alkyl containing from 1 to 8 carbon atoms, and X is a member of the group consisting of oxygen and sulfur.

7. A method as defined in claim 6 in which R is propyl, R' is methyl, and X is oxygen.
8. A method as defined in claim 6 in which R is butyl, R' is methyl, and X is oxygen.
9. A method as defined in claim 6 in which R and R' are butyl, and X is oxygen.
10. A method as defined in claim 6 in which R is butyl, R' is octyl, and X is oxygen.

References Cited by the Examiner
UNITED STATES PATENTS
2,841,486   7/1958   Osborn et al. _____ 71—2.7

LEWIS GOTTS, *Primary Examiner.*